United States Patent
Wu et al.

(10) Patent No.: US 12,349,105 B2
(45) Date of Patent: Jul. 1, 2025

(54) METHOD AND APPARATUS FOR ABSENCE TIME REQUEST

(71) Applicant: Lenovo (Beijing) Ltd., Beijing (CN)

(72) Inventors: Lianhai Wu, Chaoyang (CN); Prateek Basu Mallick, Dreieich (DE); Jing Han, Chaoyang District (CN); Bingchao Liu, Changping District (CN); Ran Yue, Haidian District (CN); Jie Hu, Changping District (CN)

(73) Assignee: Lenovo (Beijing) Ltd., Beijing (CN)

( * ) Notice: Subject to any disclaimer, the term of this patent is extended or adjusted under 35 U.S.C. 154(b) by 525 days.

(21) Appl. No.: 17/793,733

(22) PCT Filed: Feb. 12, 2020

(86) PCT No.: PCT/CN2020/074868
§ 371 (c)(1),
(2) Date: Jul. 19, 2022

(87) PCT Pub. No.: WO2021/159302
PCT Pub. Date: Aug. 19, 2021

(65) Prior Publication Data
US 2023/0127408 A1    Apr. 27, 2023

(51) Int. Cl.
*H04W 68/02* (2009.01)
*H04W 74/0833* (2024.01)
*H04W 76/20* (2018.01)

(52) U.S. Cl.
CPC ....... *H04W 68/02* (2013.01); *H04W 74/0833* (2013.01); *H04W 76/20* (2018.02)

(58) Field of Classification Search
CPC . H04W 68/12; H04W 68/02; H04W 74/0833; H04W 76/20; H04W 68/005;
(Continued)

(56) References Cited

U.S. PATENT DOCUMENTS

2006/0154664 A1* 7/2006 Hidaka ............. H04W 88/06
                                                     455/442
2015/0023284 A1* 1/2015 Zhao ................ H04W 72/00
                                                     370/329
(Continued)

FOREIGN PATENT DOCUMENTS

CN    102065541 A    5/2011
CN    102984801 A    3/2013
(Continued)

OTHER PUBLICATIONS

3GPP , "Study on system enablers for devices having multiple Universal Subscriber Identity Modules (USIM)", 3GPP TR 23.761 V0.3.0, 3rd Generation Partnership Project [retrieved Aug. 24, 2022]. Retrieved from the internet <https://www.3gpp.org/ftp/Specs/archive/23_series/23.761/>., Jan. 2020, 37 Pages.
(Continued)

*Primary Examiner* — Allahyar Kasraian
(74) *Attorney, Agent, or Firm* — FIG. 1 Patents

(57) ABSTRACT

Embodiments of the present disclosure relate to methods and apparatuses for absence time request and user equipment (UE) behavior during the absence time. According to an embodiment of the present disclosure, a method performed by a UE for wireless communication includes: transmitting a request for an absence time to a base station (BS); receiving a response assigning the absence time from the BS; suspending a connection to the BS upon receiving the response; and resuming the connection to the BS before or at the end of the absence time.

20 Claims, 4 Drawing Sheets

(58) Field of Classification Search
CPC ... H04W 68/00; H04W 68/025; H04W 68/04; H04W 68/06; H04W 68/08; H04W 68/10
See application file for complete search history.

(56) References Cited

U.S. PATENT DOCUMENTS

| | | | |
|---|---|---|---|
| 2017/0127217 A1 | 5/2017 | Miao et al. | |
| 2018/0160422 A1 | 6/2018 | Pathak et al. | |
| 2021/0392676 A1* | 12/2021 | Senoo | H04W 72/56 |
| 2022/0053448 A1* | 2/2022 | Velev | H04W 76/38 |
| 2022/0287132 A1* | 9/2022 | Zhang | H04W 76/27 |

FOREIGN PATENT DOCUMENTS

| | | |
|---|---|---|
| CN | 104780517 A | 7/2015 |
| CN | 106464611 A | 2/2017 |

OTHER PUBLICATIONS

PCT/CN2020/074868, "International Search Report and Written Opinion", PCT Application No. PCT/CN2020/074868, Nov. 19, 2020, 6 pages.

PCT/CN2020/074868, "International Preliminary Report on Patentability", PCT Application No. PCT/CN2020/074868, Aug. 25, 2022, 5 pages.

20918937.2, "Extended European Search Report", EP Application No. 20918937.2, Oct. 13, 2023, 12 pages.

Qualcomm Incorporated, "Solution for Suspend and Resume procedure", SA WG2 Meeting #135, S2-1909746, Split, Croatia [retrieved Dec. 19, 2023]. Retrieved from the Internet <https://www.3gpp.org/ftp/tsg_sa/WG2_Arch/TSGS2_135_Split/Docs?sortby=sizerev>, Oct. 2019, 5 pages.

Qualcomm Incorporated, "Two step signalling connection handling for pause and restart procedure", SA WG2 Meeting #136AH, S2-2000121, Incheon, Korea [retrieved Dec. 19, 2023]. Retrieved from the Internet <https://www.3gpp.org/ftp/tsg_sa/WG2_Arch/TSGS2_136AH_Incheon/Docs>, Jan. 2020, 4 pages.

Sony, "Solution: Busy Indication as a paging response", SA WG2 Meeting #135, S2-1909466, Split, KR [retrieved Dec. 19, 2023]. Retrieved from the Internet <https://www.3gpp.org/ftp/tsg_sa/WG2_Arch/TSGS2_135_Split/Docs>, Oct. 2019, 5 pages.

2020800962093.6, "Foreign Office Action", CN Application No. 2020800962093.6, Sep. 6, 2024, 15 pages.

"Foreign Office Action", CN Application No. 202080096209.6, Jan. 25, 2025, 23 pages.

* cited by examiner

METHOD AND APPARATUS FOR ABSENCE TIME REQUEST

TECHNICAL FIELD

Embodiments of the present disclosure are related to wireless communication technology, and more particularly, related to methods and apparatuses for absence time request.

BACKGROUND

Many commercially deployed devices (e.g., cell phones, tablets, laptops, internet-of-things (IoT) devices, etc.) may include more than one subscriber identity module (SIM). These devices can be referred to as multi-SIM devices.

Generally, a SIM may correspond to at least one subscription in an environment where a radio access technology (RAT) is adopted, and can also be referred to as a user equipment (UE). For example, a multi-SIM device may have a first SIM associated with a first subscription and a second SIM associated with a second subscription. As such, a user can use both the first and second subscriptions from the same device. In some examples, the first subscription may include a personal subscription, and the second subscription may include a business subscription. In some examples, both subscriptions may be personal subscriptions. The user may choose one of them to use based on the selected service (e.g., use one for individual subscription and the other for "family circle" plan). The SIMS in a multi-SIM device may be from the same mobile network operator (MNO) or from different MNOs.

Support for multi-SIM is currently handled in an implementation-specific manner without any support from 3GPP (3rd Generation Partnership Project) specifications, resulting in a variety of implementations and UE behaviors, e.g., Dual-SIM-Single-Standby, Dual-SIM-Dual-Standby, Dual-SIM-Dual-Active, etc.

For cost efficiency reasons, the SIMS in a multi-SIM device typically share common hardware component(s), e.g., radio frequency (RF) component(s) or baseband component(s). Each SIM may be configured to monitor paging messages on a radio access network (RAN) during a periodic, short paging occasion. For a multi-SIM device with two SIMS (SIM A and SIM B), there may be a situation where SIM B receives a paging message from a base station (BS) B in a paging occasion while SIM A has an ongoing service on a connection to BS A. If SIM B does not send any response to the paging message, BS B will keep retransmitting the paging message in a larger and larger area, which will result in a waste of paging resources. Thus, even if the multi-SIM device decides not to switch from SIM A to SIM B at the moment, SIM B still needs to send a busy indication to inform BS B that it has received the paging message. In such a case, an absence time for SIM A is needed, in which SIM B can use the common hardware component(s) shared by SIM A and SIM B to complete a busy indication procedure.

The absence time for a busy indication procedure may be longer than the paging occasion for monitoring paging messages. Therefore, it is required to design a procedure for requesting the absence time as well as UE behaviors during and after the absence time.

SUMMARY OF THE DISCLOSURE

According to an embodiment of the present disclosure, a method performed by a UE for wireless communication includes: transmitting a request for an absence time to a BS; receiving a response assigning the absence time from the BS; suspending a connection to the BS upon receiving the response; and resuming the connection to the BS before or at the end of the absence time.

According to another embodiment of the present disclosure, a method performed by a BS for wireless communication includes: receiving a request for an absence time from a UE; transmitting a response assigning the absence time to the UE; suspending a connection to the UE; and resuming the connection to the UE before or at the end of the absence time.

According to yet another embodiment of the present disclosure, an apparatus includes: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to any embodiment of the present disclosure with the at least one receiver, the at least one transmitter and the at least one processor.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Figure 1:
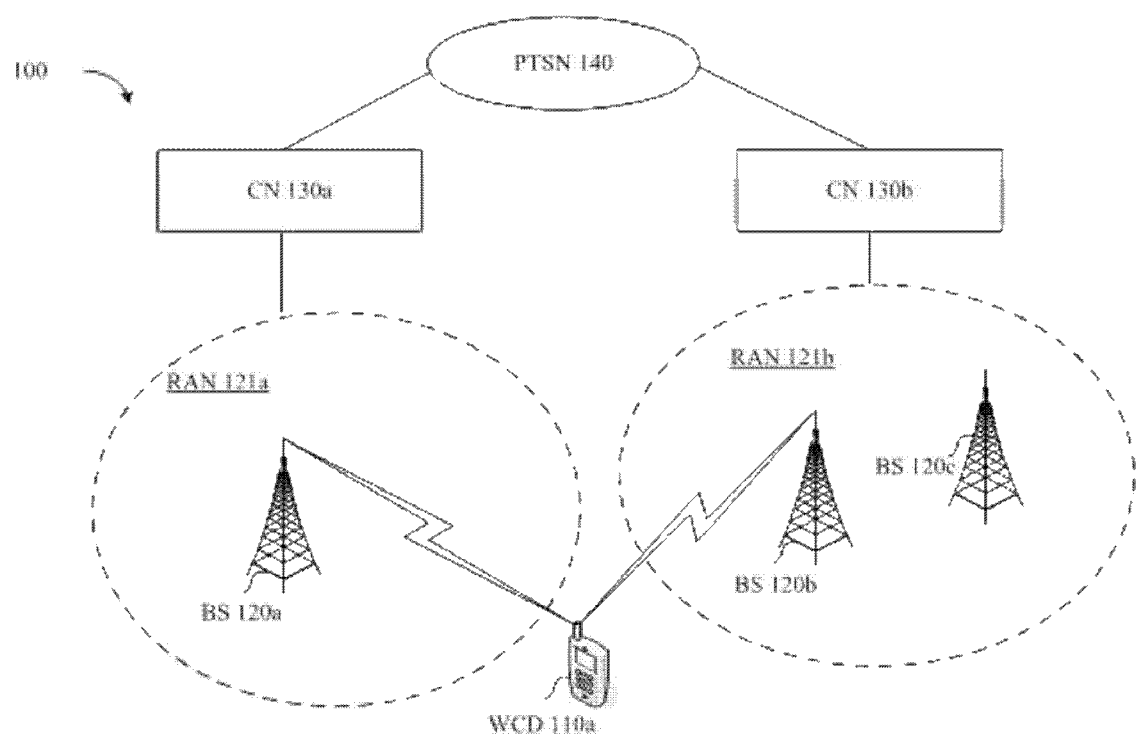
FIG. 1 illustrates a wireless communication system according to some embodiments of the present disclosure.

FIG. 1 illustrates a wireless communication system 100 according to some embodiments of the present disclosure.

Referring to FIG. 1, a wireless communication system 100 may include some wireless communication devices (WCDs) 110a, some base stations (BSs) 120a, 120b, and 120c, some radio access networks (RANs) 121a and 121b, some core networks (CNs) 130a and 130b, and a public switched telephone network (PSTN) 140. It is contemplated that the wireless communication system 100 may include any number of wireless communication devices, BSs, networks, and/or network components.

Each of BS 120a, BS 120b, and BS 120c may be any type of device configured to wirelessly interface with at least one WCD (e.g., WCD 110a) to facilitate access to one or more communication networks, such as CN 130a and/or CN 130b. Each of BS 120a, BS 120b, and BS 120c may operate, for example based on a standard protocol such as Long-Term Evolution (LTE), LTE-Advanced (LTE-A), New Radio (NR), or other suitable protocol(s). For example, BS 120a, BS 120b, and BS 120c may include an eNB or a gNB. Persons skilled in the art should understand that as the 3GPP (3rd Generation Partnership Project) and communication technology develop, the terminologies recited in the specification may change, which should not affect the principle of the disclosure.

BS 120a may be part of RAN 121a, which may also include other BSs and/or network elements (not shown), such as a base station controller (BSC), a radio network controller (RNC), relay nodes, etc. Also, BS 120b and BS 120c may be part of RAN 121b that may also include other BSs and/or network elements (not shown in FIG. 1). Each of BS 120a, BS 120b, and BS 120c may be configured to transmit and/or receive wireless signals within a particular geographic region, which may be referred to as a cell (not shown in FIG. 1).

RAN 121a may be in communication with CN 130a, and RAN 121b may be in communication with CN 130b. RAN 121a and RAN 121b may employ the same or different radio access technologies (RATs). For example, RAN 121a may employ an Evolved Universal Terrestrial Radio Access Network (E-UTRAN) radio technology, and RAN 121b may employ an NR radio technology. Each of CN 130a and CN 130b may include a plurality of core network components, such as a mobility management entity (MME) (not shown in FIG. 1) or an access and mobility management function (AMF) (not shown in FIG. 1). The CNs may serve as a gateway for the WCDs to access PTSN 140 and/or other networks (not shown in FIG. 1).

WCD 110a may be any type of device configured to operate and/or communicate in a wireless environment. By way of example, WCD 110a may include a user equipment (UE), a mobile station, a fixed or mobile subscriber unit, a pager, a cellular phone, a personal digital assistant, a smartphone, a laptop, a netbook, a personal computer, a wireless sensor, consumer electronics, a smart watch and the like. Persons skilled in the art should understand that as technology develops and advances, the terminologies described in the present disclosure may change, but should not affect or limit the principles and spirit of the present disclosure.

WCD 110a may include one or more subscriber identity modules (SIMS) that enable it to access one or more separate wireless communication networks. As shown in FIG. 1, WCD 110a may be configured to access either RAN 121a through BS 120a by virtue of a first SIM (not shown in FIG. 1) in WCD 110a or RAN 121b through BS 120b by virtue of a second SIM (not shown in FIG. 1) in WCD 110a. While WCD 110a is shown connected to RAN 121a and RAN 121b, in other examples (not shown), WCD 110a may establish additional network connections using additional RATs.

Each of the first and second SIMS may be associated with one kind of wireless communication system. For example, either the first SIM or the second SIM may be represented by a SIM card corresponding to a GSM system, a Universal Subscriber Identity Module (USIM) card corresponding to a UMTS system, a Removable User Identity Module (RUIM) card or a CDMA Subscriber Identity Module (CSIM) card corresponding to a CDMA2000 communication system, a Universal Integrated Circuit Card (UICC) corresponding to a 5G (NR) communication system, a wireless network card corresponding to IEEE 802.11x wireless local area network (WLAN), or other suitable modules that can identify the subscribers.

A WCD that includes a plurality of SIMS and connects to two or more networks with two or more SIMS being active at a given time may be a Multi-SIM-Multi-Active (MSMA) communication device. An example MSMA communication device may be a Dual-SIM-Dual-Active (DSDA) communication device, which may include two SIMS. Both SIMS may remain active.

On the other hand, a WCD provided with a plurality of SIMS and connected to two or more networks with one SIM being active at a given time is a Multi-SIM-Multi-Standby (MSMS) communication device. An example of the MSMS communication device may be a Dual-SIM-Dual-Standby (DSDS). A DSDS communication device may include two SIMS, and may use a single radio front-end and baseband to register the communication device to a single (the same) public land mobile network (PLMN) or to two different PLMNs with the two SIMS, respectively.

In a multi-SIM wireless communication device, e.g., an MSMS communication device, a plurality of SIMS may share common hardware component(s), e.g., radio frequency (RF) component(s) (such as an RF transceiver) or baseband component(s), of the wireless communication device. However, embodiments described herein may also be applicable to multi-SIM wireless communication devices in which each of the plurality of SIMS is associated with separate hardware component(s) with one of the plurality of SIMS being active while the rest are deactivated.

For example, a multi-SIM wireless communication device may support a first subscription service enabled by a first SIM (SIM A) and a second subscription service enabled by a second SIM (SIM B). Each SIM may be configured to monitor paging messages on a corresponding RAN during a respective paging occasion. As described above, there may be a situation where SIM B receives a paging message from BS B in a paging occasion while SIM A has an ongoing service on a connection to BS A. If, for example, the paging message from BS B is associated with a service of higher priority than the ongoing service, the communication device may decide to terminate the ongoing service and switch from SIM A to SIM B. Otherwise, the communication device may decide not to switch from SIM A to SIM B.

However, if SIM B does not send any response to the paging message, BS B will keep retransmitting the paging message in a larger and larger area, which will result in a waste of paging resources. Thus, even if the communication device decides not to switch from SIM A to SIM B at the moment, SIM B still needs to send a busy indication to inform BS B that it has received the paging message but it is busy now such that BS B will not retransmit the paging message. In such a case, an absence time is needed, in which SIM A can suspend the connection to BS A and SIM B can use the common hardware component(s) shared by SIM A and SIM B to complete a busy indication procedure for sending a busy indication to BS B.

The time needed for completing a busy indication procedure may be longer than the paging occasion for monitoring paging messages. That is, the paging occasion configured for SIM B may be insufficient to complete the busy indication procedure. Therefore, the multi-SIM wireless communication device needs to request BS A for an additional period of time (i.e., the absence time) for completing the busy indication procedure, and an independent procedure for requesting the absence time is required.

Figure 2:
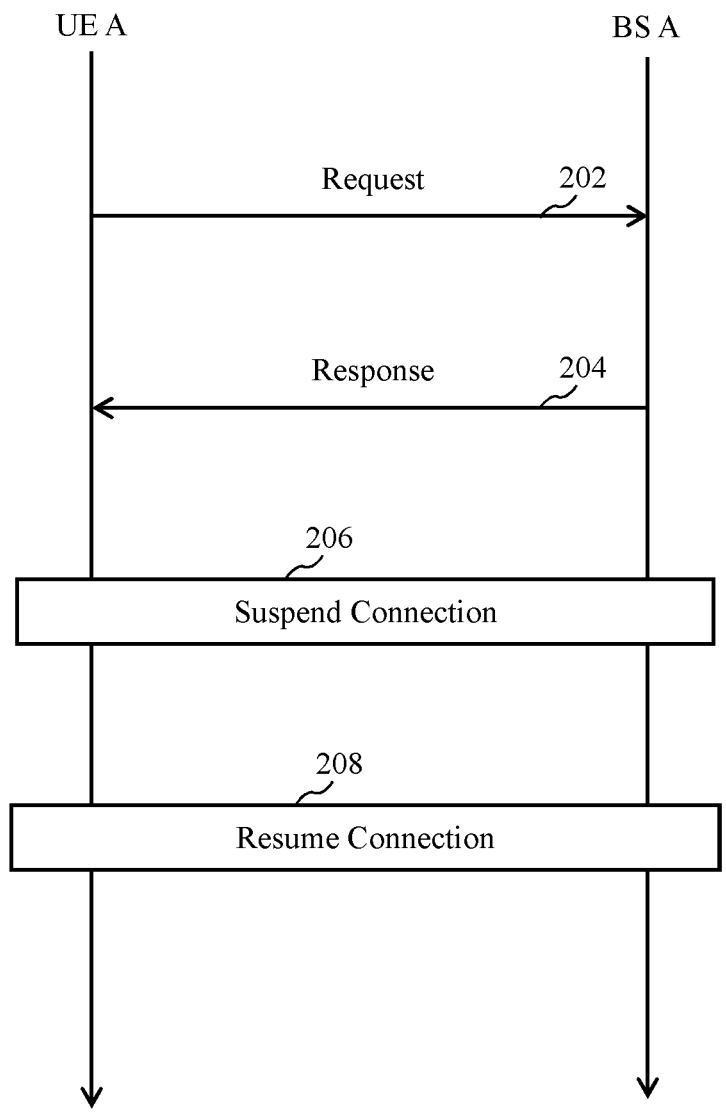
FIG. 2 illustrates a flow chart of an exemplary procedure for requesting an absence time according to some embodiments of the present disclosure.

FIG. 2 illustrates a flow chart of an exemplary procedure for requesting an absence time according to some embodiments of the present disclosure.

In FIG. 2, UE A may represent a first SIM (SIM A) in a multi-SIM wireless communication device (e.g., WCD 110a in FIG. 1). UE A may be configured to access a first RAN (e.g., RAN 121a in FIG. 1) through BS A (e.g., BS 120a in FIG. 1). The multi-SIM wireless communication device may additionally include a second SIM (SIM B, also referred to as UE B). UE B may be configured to access a second RAN (e.g., RAN 121b in FIG. 1) through BS B (e.g., BS 120b in FIG. 1).

When UE B receives a paging message from BS B while UE A has an ongoing service on a connection to BS A, the multi-SIM wireless communication device may decide whether to terminate the ongoing service or to keep the ongoing service. If the multi-SIM wireless communication device decides to keep the ongoing service, UE B may transmit a busy indication to BS B. If the multi-SIM wireless communication device decides to transmit a busy indication to BS B (for example, in the case where the paging message from BS B is associated with a service of lower priority than the ongoing service), UE A may transmit a request for an absence time to BS A, at 202. The request for an absence time may include assistant information which BS A may use to determine whether to assign an absence time for UE A and/or determine a beginning time point and a length of the absence time.

According to some embodiments of the present disclosure, the request for an absence time may include a paging cause included in the paging message received from BS B. The paging cause is associated with a type of the service associated with the paging message. BS A may decide whether to reject the request based on the type of the service (e.g., FTP (File Transfer Protocol) service, e-mail service, etc.).

According to some embodiments of the present disclosure, the request for an absence time may include indication of whether the paging message is an RAN paging or a CN paging. In both an LTE network and an NR network, RAN paging is introduced for UEs in an inactive mode. If an RAN paging of a BS to a UE fails, the BS may configure the UE to an idle mode. In order to avoid this case, UE A may need to indicate to BS A whether the paging message is an RAN paging or a CN paging.

According to some embodiments of the present disclosure, in the case that the paging message is an RAN paging, the request for an absence time may include indication of whether a user plane function (UPF) or an access and mobility management function (AMF) triggers the RAN paging. The UPF of a BS may trigger an RAN paging to a UE when there is user plane data for transmission to the UE. The AMF of a BS may trigger an RAN paging to a UE when there is UE-associated signalling for transmission to the UE. Depending on whether the RAN paging of a BS is triggered by UPF or AMF, the BS may perform different actions when the RAN paging fails. Thus, UE A may need to indicate to BS A whether UPF or AMF triggers the RAN paging.

According to some embodiments of the present disclosure, the request for an absence time may include a configuration from BS B, which can be used to deduce time durations related to a random access procedure (i.e., the busy indication procedure) that UE B will perform to send the busy indication to BS B. For example, the configuration from BS B may include a time-domain random access channel (RACH) resource for preamble transmission for the random access procedure. In a legacy LTE network, the random access preamble may be transmitted in Msg 1. In an NR network, the random access preamble may be transmitted in Msg 1 or Msg A. Additionally or alternatively, the configuration from BS B may include a value of a random access response window (ra-ResponseWindow). Additionally or alternatively, the configuration from BS B may include indication of whether a two-step random access procedure (e.g., Msg A+Msg B) is allowed or not. If a two-step random access procedure is allowed, the random access procedure may be shorter in time domain, and BS A may decide to assign a shorter absence time for the busy indication procedure performed by UE B.

According to some embodiments of the present disclosure, the request for an absence time may include information describing a time duration suggested by UE A. The suggested time duration may be described as a time offset between BS A and BS B. Additionally or alternatively, the suggested time duration may be described as one or more beginning time points for available preamble transmission (e.g., Msg 1 or Msg A). Additionally or alternatively, the suggested time duration may be described as a suggested length of time duration. Additionally or alternatively, the suggested time duration may be described as a combination of a beginning system frame number (SFN), one or more beginning slot numbers, and a number of consecutive slots corresponding to each beginning slot number. In an embodiment of the present disclosure, the suggested time duration may be represented by a bitmap.

Any of the above assistant information or any combination thereof can be included in the request for an absence time. Persons skilled in the art should understand that the above assistant information is described for purposes of explanation and should not be considered limiting of the techniques as broadly exemplified and described in this disclosure.

Referring back to FIG. 2, after BS A receives the request for an absence time from UE A, BS A may determine whether to assign the absence time for UE A and/or determine a beginning time point and a length of the absence time, for example, based on the assistant information included in the request. In the case that BS A determines to assign the absence time for UE A, BS A may transmit a response assigning the absence time to UE A, at 204. Then, BS A will not transmit any data packet to UE A (i.e., suspending the connection to UE A) within the absence time unless UE A returns to BS A before the end of the absence time. Here, "UE A returns to BS A" means that the connection between UE A and BS A is resumed.

According to some embodiments of the present disclosure, the response may include a configuration for a timer (i.e., absence timer) corresponding to the absence time. Upon receipt of the response, UE A may start the absence timer, which will expire at the end of the absence time. According to other embodiments of the present disclosure, the response may include information indicating a duration corresponding to the absence time. For example, for an LTE network, the information may include a beginning SFN, a beginning subframe number, and a number of consecutive subframes within the duration; for an NR network, the information may include a beginning SFN, a beginning slot number, and a number of consecutive slots within the duration. Persons skilled in the art should understand that any other information that can describe the duration also can be additionally or alternatively included in the response.

As shown in FIG. 2, UE A may suspend the connection to BS A upon receiving the response assigning the absence time from BS A, at 206. In an embodiment of the present disclosure, to suspend the connection, an access stratum (AS) layer of UE A may indicate a suspend state and a length of the absence time to an application layer and a non-access stratum (NAS) layer of UE A. However, the synchronization timer (e.g., TimeAlignmentTimer) representing a synchronization state between UE A and BS A will not be suspended when UE A enters the suspend state.

According to an embodiment of the present disclosure, when UE A enters the suspend state, UE A may suspend a periodic timer (e.g., periodicBSR-Timer) to trigger buffer status report (BSR) transmission and a timer (e.g., retxBSR-TImer) to trigger BSR retransmission.

A BSR is used by a UE to provide its serving BS with information about uplink (UL) data volume in a medium access control (MAC) entity of the UE, such that the serving BS can allocate corresponding resources for UL data transmission. A BSR may be triggered if any of the following events occur:
(1) UL data, for a logical channel which belongs to an logical channel group (LCG), becomes available to the MAC entity, and either this UL data belongs to a logical channel with higher priority than any other logical channel containing available UL data which belong to any LCG, or none of other logical channels which belong to an LCG contains any available UL data;
(2) UL resources are allocated and the number of padding bits is equal to or larger than the size of the BSR MAC control element (CE) plus its subheader;
(3) The retxBSR-Timer expires, and at least one of the logical channels which belong to an LCG contains UL data; or
(4) The periodicBSR-Timer expires.

When UE A enters the suspend state, if the retxBSR-Timer and the periodicBSR-Timer are not suspended, a BSR may be triggered because of expiry of the retxBSR-Timer or periodicBSR-Timer. If such BSR is triggered and no UL resource is granted, a scheduling request (SR) will be triggered. Furthermore, it is possible that a random access may be triggered because of no SR resource. Then, a radio link failure (RLF) will happen because of unsuccessful random access. To avoid such situation, UE A may suspend the periodicBSR-Timer and the retxBSR-Timer when it enters the suspend state. UE A may resume the periodicBSR-Timer and the retxBSR-Timer when the connection to BS A is resumed, e.g., at the end of the absence time. According to another embodiment of the present disclosure, if UE A returns to BS A before the end of the absence time, explicit RRC signaling may be used to resume the periodicBSR-Timer and the retxBSR-Timer.

In an embodiment of the present disclosure, UE A is not allowed to trigger a BSR for transmission to BS A when the connection to BS A is suspended. In another embodiment of the present disclosure, a BSR may be triggered during the absence time, but UE A is not allowed to transmit the BSR to BS A when the connection to BS A is suspended. In addition, even if a BSR is triggered during the absence time and no UL grant for BSR transmission is available, UE A will not trigger an SR to BS A.

After UE A enters the suspend state, the common hardware component(s) can be used by UE B to perform the busy indication procedure with BS B within the absence time. As shown in FIG. 2, the connection between UE A and BS A may be resumed, at 208, before or at the end of the absence time, for example, when the busy indication procedure is completed before or at the end of the absence time, or the absence time expires.

According to an embodiment of the present disclosure, UE A may directly return to BS A to receive downlink data and/or transmit uplink data after the absence time expires. For example, upon expiry of the absence timer, BS A may directly resume data transmission with UE A, and UE A may directly monitor a physical downlink control channel (PDCCH). According to another embodiment of the present disclosure, UE A may enter the idle mode after the absence time expires. In such a case, BS A needs to page UE A if BS A wants to resume data transmission with UE A.

As described above, UE A does not suspend the synchronization timer (e.g., TimeAlignmentTimer) representing a synchronization state between UE A and BS A even when UE A enters the suspend state. Thus, the synchronization timer may or may not expire when the busy indication procedure is completed before or at the end of the absence time.

According to some embodiments of the present disclosure, if the busy indication procedure is completed and the synchronization timer is still running, UE A may transmit a scheduling request (SR) to BS A to indicate that UE A returns to BS A. UE A may transmit an indication of completed busy indication procedure to BS A as well.

According to some embodiments of the present disclosure, if the busy indication procedure is not completed at the end of the absence time while the synchronization timer is still running, UE A may transmit an SR to BS A to indicate that UE A returns to BS A. UE A may transmit an indication of uncompleted busy indication procedure to BS A as well. Upon receiving the indication of uncompleted busy indication procedure, BS A may transmit to UE A another response assigning the absence time for completing the busy indication procedure.

According to some embodiments of the present disclosure, if the busy indication procedure is completed but the synchronization timer expires, UE A may trigger a random access procedure to BS A. UE A may transmit an indication of completed busy indication procedure to BS A during the random access procedure. For example, the indication of completed busy indication procedure may be included in Msg 3 or Msg 5 of the random access procedure.

According to some embodiments of the present disclosure, if the busy indication procedure is not completed at the end of the absence time and the synchronization timer expires, UE A may trigger a random access procedure to BS A. UE A may transmit an indication of uncompleted busy indication procedure to BS A during the random access procedure. For example, the indication of uncompleted busy indication procedure may be included in Msg 3 or Msg 5 of the random access procedure. Upon receiving the indication of uncompleted busy indication procedure, BS A may transmit to UE A another response assigning the absence time for completing the busy indication procedure.

In the case that BSR is not allowed to be triggered when the connection between UE A and BS A is suspended, once UE A returns to BS A before, at, or even after the end of the absence time, UE A may trigger a BSR to inform BS A of an updated value of buffer size, which may change (e.g., increase) during the absence time.

In the case that BSR is allowed to be triggered but not allowed to be transmitted when the connection between UE A and BS A is suspended, if a BSR was triggered during the absence time, UE A may transmit the BSR to BS A once UE A returns to BS A before, at, or even after the end of the absence time. If no BSR was triggered during the absence time, UE A may not trigger a BSR for transmission to BS A once UE A returns to BS A.

Persons skilled in the art should understand that FIG. 2 is provided for purposes of explanation and should not be considered limiting of the techniques as broadly exemplified and described in this disclosure.

Figure 3:
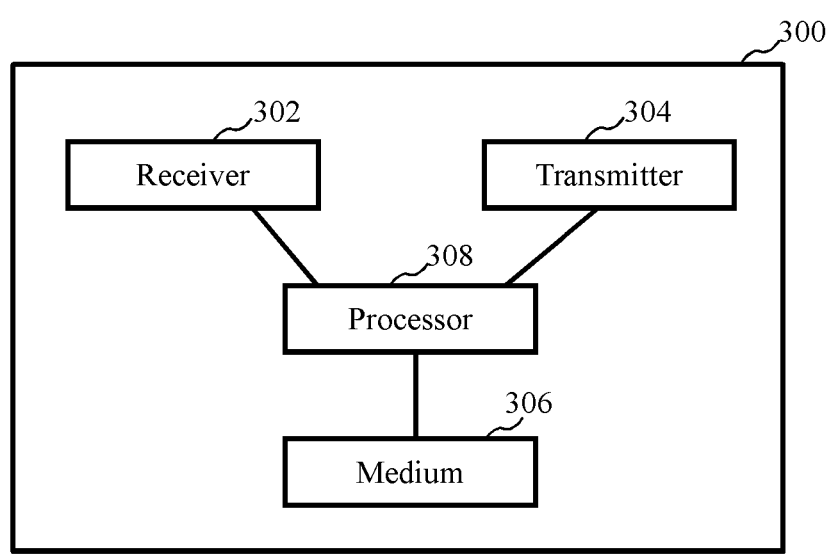
FIG. 3 illustrates an exemplary block diagram of an apparatus according to an embodiment of the present disclosure.

FIG. 3 illustrates an exemplary block diagram of an apparatus 300 according to an embodiment of the present disclosure. In some embodiments of the present disclosure, the apparatus 300 may include a UE (e.g., UE A), which can at least perform the method illustrated in FIG. 2.

As shown in FIG. 3, the apparatus 300 may include at least one receiver 302, at least one transmitter 304, at least one non-transitory computer-readable medium 306, and at least one processor 308 coupled to the at least one receiver 302, the at least one transmitter 304, and the at least one non-transitory computer-readable medium 306.

Although in FIG. 3, elements such as receiver 302, transmitter 304, non-transitory computer-readable medium 306, and processor 308 are described in the singular, the plural is contemplated unless limitation to the singular is explicitly stated. In some embodiments of the present disclosure, the at least one receiver 302 and the at least one transmitter 304 are combined into a single device, such as a transceiver. In certain embodiments of the present disclosure, the apparatus 300 may further include an input device, a memory, and/or other components.

In some embodiments of the present disclosure, the at least one non-transitory computer-readable medium 306 may have stored thereon computer-executable instructions which are programmed to implement the steps of the methods, for example as described in view of FIG. 2, with the at least one receiver 302, the at least one transmitter 304, and the at least one processor 308.

For example, the at least one transmitter 304 may transmit a request for an absence time to a BS (e.g., BS A). The at least one receiver 302 may receive a response assigning the absence time from the BS. The at least one processor 308 may suspend a connection to the BS upon receiving the response. Furthermore, the at least one processor 308 may resume the connection to the BS before or at the end of the absence time.

According to some embodiments of the present disclosure, the request for the absence time may include at least one of the following information: a paging cause included in a paging message from a second BS (e.g., BS B); indication of whether the paging message is an RAN paging or a CN paging; indication of whether a UPF or an AMF triggers the RAN paging; or a configuration from the second BS. The configuration from the second BS may include at least one of: a time-domain RACH resource for preamble transmission for a random access procedure; a value of a random access response window; or indication of whether a two-step random access procedure is allowed.

According to some embodiments of the present disclosure, the response may include a configuration for a timer corresponding to the absence time. In response to receiving the response, apparatus 300 may start the timer. In some embodiments of the present disclosure, the connection to the BS may be resumed after the timer expires. In other embodiments of the present disclosure, apparatus 300 may enter an idle mode after the timer expires.

According to some embodiments of the present disclosure, the response may include information indicating a duration corresponding to the absence time. The information may include a beginning SFN, a beginning subframe number, and a number of consecutive subframes within the duration. Alternatively, the information may include a SFN, a beginning slot number, and a number of consecutive slots within the duration.

According to some embodiments of the present disclosure, the at least one processor 308 may indicate a suspend state and a length of the absence time to an application layer and an NAS layer by an AS layer. The at least one processor 308 may suspend a periodic timer to trigger BSR transmission and a timer to trigger BSR retransmission in the absence time, and may resume these timers when the connection to the BS is resumed.

Figure 4:
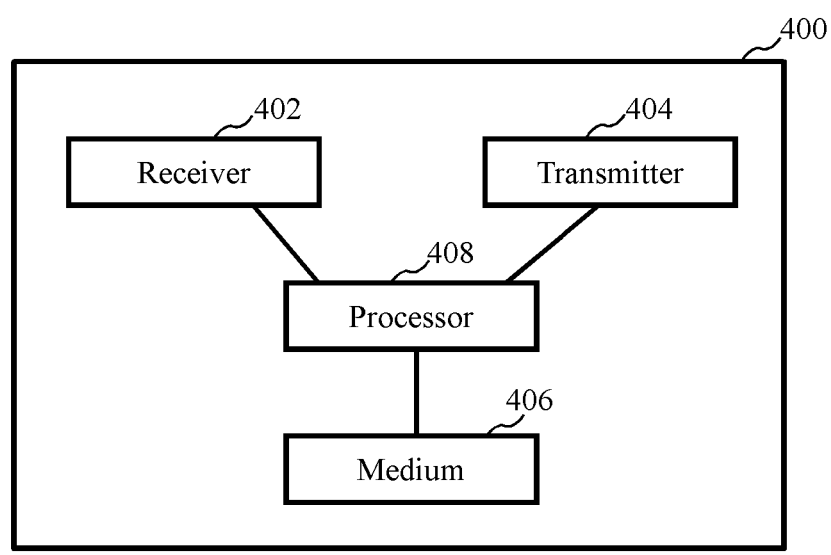
FIG. 4 illustrates an exemplary block diagram of an apparatus according to another embodiment of the present disclosure.

FIG. 4 illustrates an exemplary block diagram of an apparatus 400 according to another embodiment of the present disclosure. In some embodiments of the present disclosure, the apparatus 400 may be a BS (e.g., BS A), which can at least perform the method illustrated in FIG. 2.

As shown in FIG. 4, the apparatus 400 may include at least one receiver 402, at least one transmitter 404, at least one non-transitory computer-readable medium 406, and at least one processor 408 coupled to the at least one receiver 402, the at least one transmitter 404, and the at least one non-transitory computer-readable medium 406.

Although in FIG. 4, elements such as receiver 402, transmitter 404, non-transitory computer-readable medium 406, and processor 408 are described in the singular, the plural is contemplated unless limitation to the singular is explicitly stated. In some embodiments of the present disclosure, the at least one receiver 402 and the at least one transmitter 404 are combined into a single device, such as a transceiver. In certain embodiments of the present disclosure, the apparatus 400 may further include an input device, a memory, and/or other components.

In some embodiments of the present disclosure, the at least one non-transitory computer-readable medium 406 may have stored thereon computer-executable instructions which are programmed to implement the steps of the methods, for example as described in view of FIG. 2, with the at least one receiver 402, the at least one transmitter 404, and the at least one processor 408.

For example, the at least one receiver 402 may receive a request for an absence time from a UE (e.g., UE A). The at least one transmitter 404 may transmit a response assigning the absence time to the UE. The at least one processor 408 may suspend a connection to the UE; and resume the connection to the UE before or at the end of the absence time.

According to some embodiments of the present disclosure, the response may include a configuration for a timer corresponding to the absence time. The apparatus 400 may resume data transmission with the UE after the timer expires. Alternatively, the apparatus 400 may page the UE to resume data transmission with the UE after the timer expires.

According to some embodiments of the present disclosure, the at least one receiver 402 may receive a scheduling request and an indication of whether a busy indication procedure is completed from the UE. According to other embodiments of the present disclosure, the at least one receiver 402 may receive an indication of whether a busy indication procedure is completed in a random access procedure triggered by the UE. In response to an indication indicating that a busy indication procedure is uncompleted, the at least one transmitter 404 may transmit another response assigning the absence time to the UE.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

We claim:

1. A user equipment (UE) for wireless communication, comprising:
   at least one memory; and
   at least one processor coupled with the at least one memory and configured to cause the UE to:
   transmit a request for an absence time to a base station (BS);
   receive a response assigning the absence time from the BS, wherein the response comprises information indicating a duration corresponding to the absence time, and wherein the information comprises a beginning system frame number (SFN), a beginning sub-frame number, and a number of consecutive subframes within the duration;
   suspend a connection to the BS based on receiving the response; and
   resume the connection to the BS before or at an end of the absence time.

2. The UE of claim 1, wherein the request comprises at least one of:
   a paging cause included in a paging message from a second BS;
   indication of whether the paging message is a radio access network (RAN) paging or a core network (CN) paging;
   indication of whether a user plane function (UPF) or an access and mobility management function (AMF) triggers the RAN paging; or
   a configuration from the second BS.

3. The UE of claim 2, wherein the configuration from the second BS comprises at least one of:
   a time-domain random access channel (RACH) resource for preamble transmission for a random access procedure;
   a value of a random access response window; or
   indication of whether a two-step random access procedure is allowed.

4. The UE of claim 1, wherein the response comprises a configuration for a timer corresponding to the absence time.

5. The UE of claim 4, wherein the at least one processor is further configured to cause the UE to:
   in response to receiving the response, start the timer; and
   resume the connection to the BS after the timer expires.

6. The UE of claim 4, wherein the at least one processor is further configured to cause the UE to:
   in response to receiving the response, start the timer; and
   enter an idle mode after the timer expires.

7. The UE of claim 1, wherein the information further comprises a beginning slot number and a number of consecutive slots within the duration.

8. A base station (BS) for wireless communication, comprising:
   at least one memory; and
   at least one processor coupled with the at least one memory and configured to cause the BS to:
   receive a request for an absence time from a user equipment (UE);
   transmit a response assigning the absence time to the UE, wherein the response comprises information indicating a duration corresponding to the absence time, and wherein the information comprises a beginning system frame number (SFN), a beginning sub-frame number, and a number of consecutive subframes within the duration;
   suspend a connection to the UE; and
   resume the connection to the UE before or at an end of the absence time.

9. The BS of claim 8, wherein the request comprises at least one of:
   a paging cause included in a paging message from the BS;
   indication of whether the paging message is a radio access network (RAN) paging or a core network (CN) paging;
   indication of whether a user plane function (UPF) or an access and mobility management function (AMF) triggers the RAN paging; or
   a configuration from the BS.

10. The BS of claim 9, wherein the configuration from the BS comprises at least one of:
    a time-domain random access channel (RACH) resource for preamble transmission for a random access procedure;
    a value of a random access response window; or
    indication of whether a two-step random access procedure is allowed.

11. The BS of claim 8, wherein the response comprises a configuration for a timer corresponding to the absence time.

12. The BS of claim 11, wherein the at least one processor is further configured to cause the BS to:
    resume data transmission with the UE after the timer expires.

13. The BS of claim 11, wherein the at least one processor is further configured to cause the BS to:

page the UE to resume data transmission with the UE after the timer expires.

14. The BS of claim 8, wherein the information further comprises a beginning slot number and a number of consecutive slots within the duration.

15. A method performed by a user equipment (UE), the method comprising:
   transmitting a request for an absence time to a base station (BS);
   receiving a response assigning the absence time from the BS, wherein the response comprises information indicating a duration corresponding to the absence time, and wherein the information comprises a beginning system frame number (SFN), a beginning sub-frame number, and a number of consecutive subframes within the duration;
   suspending a connection to the BS based on receiving the response; and
   resuming the connection to the BS before or at an end of the absence time.

16. The method of claim 15, wherein the request comprises at least one of:
   a paging cause included in a paging message from a second BS;
   indication of whether the paging message is a radio access network (RAN) paging or a core network (CN) paging;
   indication of whether a user plane function (UPF) or an access and mobility management function (AMF) triggers the RAN paging; or
   a configuration from the second BS.

17. The method of claim 16, wherein the configuration from the second BS comprises at least one of:
   a time-domain random access channel (RACH) resource for preamble transmission for a random access procedure;
   a value of a random access response window; or
   indication of whether a two-step random access procedure is allowed.

18. A method performed by a base station (BS), the method comprising:
   receiving a request for an absence time from a user equipment (UE);
   transmitting a response assigning the absence time to the UE, wherein the response comprises information indicating a duration corresponding to the absence time, and wherein the information comprises a beginning system frame number (SFN), a beginning sub-frame number, and a number of consecutive subframes within the duration;
   suspending a connection to the UE; and
   resuming the connection to the UE before or at an end of the absence time.

19. The method of claim 18, wherein the request comprises at least one of:
   a paging cause included in a paging message from a base station (BS);
   indication of whether the paging message is a radio access network (RAN) paging or a core network (CN) paging;
   indication of whether a user plane function (UPF) or an access and mobility management function (AMF) triggers the RAN paging; or
   a configuration from the BS.

20. The method of claim 19, wherein the configuration from the BS comprises at least one of:
   a time-domain random access channel (RACH) resource for preamble transmission for a random access procedure;
   a value of a random access response window; or
   indication of whether a two-step random access procedure is allowed.

* * * * *